United States Patent [19]

Witkowski et al.

[11] Patent Number: 5,261,083
[45] Date of Patent: Nov. 9, 1993

[54] FLOPPY DISK CONTROLLER INTERFACE FOR SUPPRESSING FALSE VERIFY CYCLE ERRORS

[75] Inventors: Todd R. Witkowski, Bainbridge Township; Anthony M. Olson, Stevensville; Thomas N. Robinson; Jimmy D. Smith, both of Lincoln Township, all of Mich.

[73] Assignee: Zenith Data Systems Corporation, Buffalo Grove, Ill.

[21] Appl. No.: 692,371

[22] Filed: Apr. 26, 1991

[51] Int. Cl.⁵ ............................... G06F 11/00
[52] U.S. Cl. ................ 395/575; 364/242.3; 364/242.31; 364/DIG. 1; 395/425
[58] Field of Search ................ 371/40.1, 16.1; 395/575, 425, 325, 725; 364/242.3, 242.31

[56] References Cited

U.S. PATENT DOCUMENTS

| | | |
|---|---|---|
| 4,716,523 | 12/1987 | Burrus, Jr. et al. ........... 364/200 |
| 4,837,677 | 6/1989 | Burrus, Jr. et al. ........... 364/200 |
| 4,974,150 | 11/1990 | Long et al. .................... 364/200 |

Primary Examiner—Charles E. Atkinson
Attorney, Agent, or Firm—Flynn, Thiel, Boutell & Tanis

[57] ABSTRACT

A system includes a system bus having data lines, an acknowledge line, an enable line, and a control line, a data storage device, a controller circuit, and an arrangement coupling the system bus, controller circuit and data storage device. The system bus can carry out a data transfer cycle in which the acknowledge, enable and control lines are actuated and the controller obtains and checks data from the data storage device and supplies it to data lines of the bus, and a verify cycle in which the acknowledge and enable lines are actuated and the control line is deactuated and the controller obtains and checks data from the storage device but does not supply it to the bus. The controller circuit is capable of operating in different modes, in one of which it forcibly sets a false error indication in response to the verify cycle. In response to the acknowledge line and enable line being simultaneously actuated while the control line remains deactuated throughout a cycle, an arrangement supplies a special signal to the controller circuit so that the controller circuit interprets the cycle as a data transfer cycle and does not set a false error indication.

14 Claims, 5 Drawing Sheets

FLOPPY DISK CONTROLLER INTERFACE FOR SUPPRESSING FALSE VERIFY CYCLE ERRORS

FIELD OF THE INVENTION

This invention relates to a method and apparatus for suppressing false error conditions in a disk controller integrated circuit.

BACKGROUND OF THE INVENTION

The Industry Standard Architecture (ISA) specification is a conventional and widely-used configuration in a computer system for a system bus connecting a central processing unit (CPU) to various devices such as a disk controller circuit for one or more floppy disk drives. Under the ISA specification, the bus could carry out a direct memory access (DMA) read cycle, in which data was transferred from a local memory associated with the central processing unit across the system bus to the disk controller circuit for storage on a disk drive. In a DMA write cycle of the bus, data would be obtained from a disk drive, error-checked, and transferred across the system bus to the local memory. In a DMA verify cycle, substantially the same sequence as in a DMA write cycle would occur, except that the data would not be transferred across the system bus to the local memory. The purpose of the DMA verify cycle is to check data on the disk for errors.

Newer computer systems use an enhanced version of the ISA standard which is the Extended Industry Standard Architecture (EISA). The EISA standard is completely compatible with the ISA standard, and also includes some additional features. Under both standards, one or more devices commonly called "bus masters" can be coupled to the system bus and can take control of the system bus. However, certain features of the EISA standard have the effect of preventing the bus from responding as quickly as was possible under the ISA standard, which in particular means that data may not be transferred across the bus to or from the disk controller circuit as fast as was the case under the ISA standard. For example, under the ISA standard a disk controller was assured that the maximum time between successive transfers would not exceed 14.5 $\mu$sec, whereas with the EISA standard the time between successive transfers can be as long as 30.9 $\mu$sec, and in certain circumstances can be even longer. Consequently, a disk controller under the ISA standard could place a byte read from a disk in a register and expect that within 14.5 $\mu$sec the byte would normally be picked up and that another byte read from disk could be placed in the register, whereas under EISA the first byte might not be picked up within 14.5 $\mu$sec and could thus be irretrievably lost if it was replaced with the second byte after only 14.5 $\mu$sec. In order to address this problem, a new integrated circuit was developed which contains an enhanced disk controller circuit.

The enhanced disk controller circuit includes a selectively actuable first-in/first-out (FIFO) memory, so that when data is being transferred across the bus from the disk controller, up to sixteen bytes read from the disk can be stored in the FIFO controller, thereby giving the DMA controller more time to pick up each byte. The enhanced disk controller circuit is capable of operating in an ISA compatible mode, and if the FIFO memory is disabled in this mode the disk controller circuit responds to DMA read, write and verify cycles in exactly the same manner as the disk controller circuit used in pre-existing computers with ISA buses. However, the enhanced disk controller is also capable of operating in additional modes, which were not present in pre-existing ISA machines and in which the FIFO memory can be enabled to facilitate successive transfers of multiple data bytes. Also, the FIFO could be enabled in the ISA compatible mode if the system is designed to allow it. Whenever the FIFO is enabled, the design of the enhanced controller circuit is such that it will operate properly if the system bus attempts to carry out an ISA-specific DMA read or write cycle, but will always automatically produce a forced error indication if the system bus attempts to carry out an ISA-specific DMA verify cycle.

This forced error indication is not a design flaw in the enhanced disk controller circuit, because if software programs are written to prevailing industry standards, they will not be attempting to carry out a DMA verify cycle when the FIFO of the enhanced disk controller circuit is enabled. However, there are some software publishers who distributed for ISA machines certain software programs which intentionally deviated from industry standards, and when these programs are used on EISA machines or on other machines using the enhanced disk controller circuit, they can cause the enhanced disk controller integrated circuit to produce false error conditions of the type just described. Although these false error conditions are due to poor software development techniques rather than to any design flaw in the enhanced disk controller integrated circuit, it is nevertheless desirable to suppress these false error indications so that even software programs which do not adhere to industry standards can be reliably run on machines using the enhanced disk controller circuit without generating false error indications.

A known approach to solving this problem is to provide a special error suppression circuit, which detects the occurrence of a DMA verify cycle, and which manipulates the signals supplied to the enhanced disk controller circuit so as to deceive the controller circuit into interpreting the cycle as a DMA write cycle. These known circuits have been adequate for their intended purposes, but have not been satisfactory in all respects. For example, one known circuit depends on the use of signals which are produced locally at the CPU but are not available on the system bus under the ISA or EISA standards, and thus this circuit cannot be used for a disk controller circuit which is to be added to the computer system in the form of a circuit board plugged into a connector slot on the system bus. Another known circuit uses only signals present on the system bus and thus can be used on a circuit card plugged into a connector slot, but may be itself deceived into interpreting a bus cycle produced under control of a bus master device as a DMA verify cycle, in which case it manipulates the signals to the disk controller circuit when it should not. Further, both approaches may in some circumstances cause three-state outputs of two different devices to try and drive a common bus simultaneously, which over time may damage the three-state devices. Moreover, both circuits may produce momentary spurious outputs to the disk controller circuit at points in time when they should not.

Accordingly, an object of the present invention is to provide an improved error suppression circuit which requires only signals present on an EISA bus, which can reliably distinguish a DMA verify cycle from bus mas-

DETAILED DESCRIPTION

Figure 1:
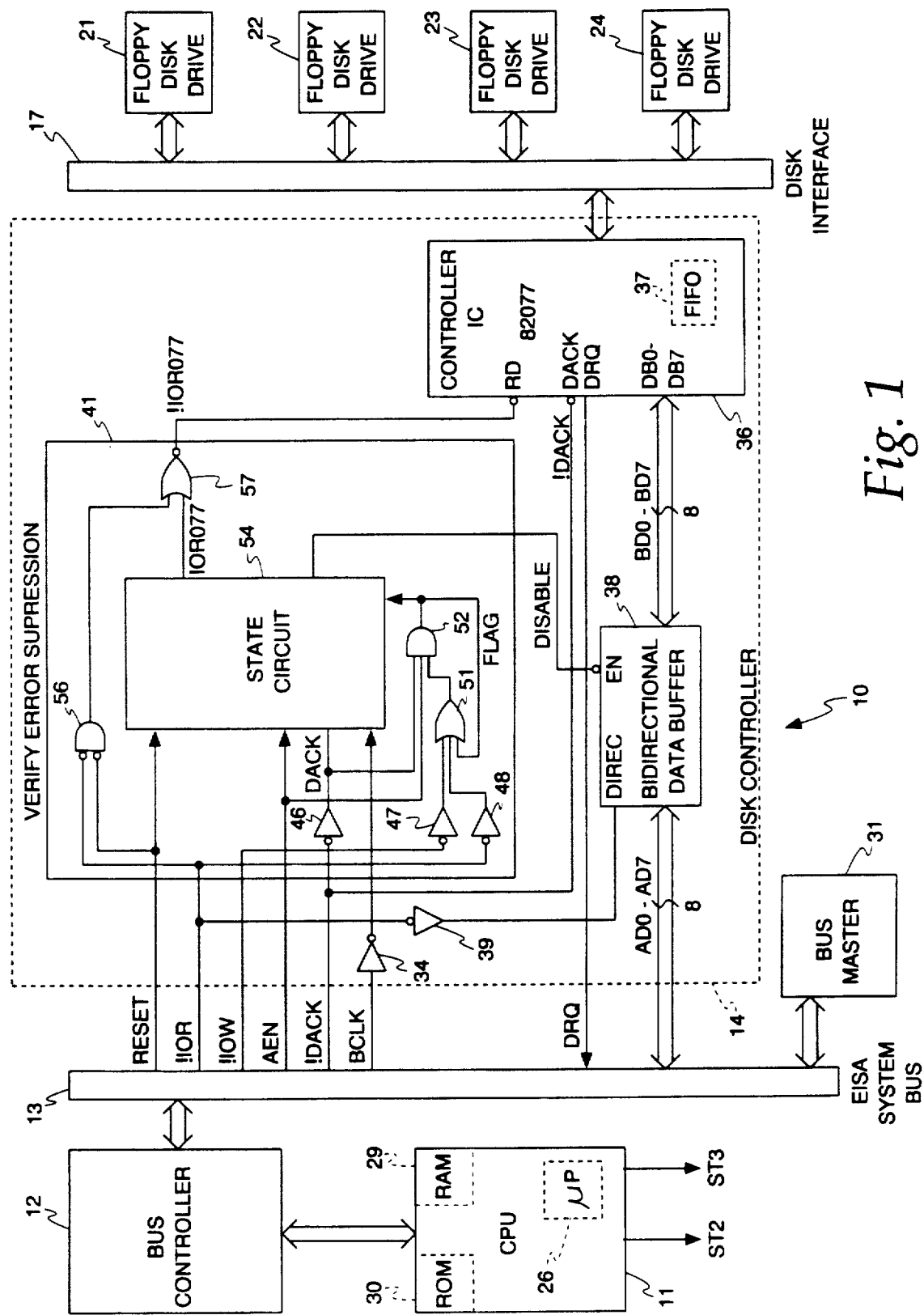
FIG. 1 is a block diagram of a computer system embodying the present invention.

Referring to FIG. 1, a computer system 10 includes a central processing unit (CPU) 11 coupled through a bus controller 12 and system bus 13 to a disk controller circuit 14 which, through an interface 17, controls up to four floppy disk drives 21-24.

The CPU 11 includes a microprocessor 26 and associated support circuitry, the microprocessor 26 in the preferred embodiment being an Intel 80486 integrated circuit made by Intel Corporation of Santa Clara, Calif. The CPU 11 also includes some local random access memory (RAM), which is indicated diagrammatically at 29. Further, the CPU 11 includes a read only memory (ROM) shown diagrammatically at 30 and containing essential computer programs of a standard type such as the basic input/output system (BIOS), which provides a standardized interface between each of a variety of software programs and hardware components such as the disk controller 14. The CPU 11 has circuitry coupled to the microprocessor 26 to generate two signals ST2 and ST3, which are intended primarily for local use within the CPU 11, and which are not connected to the bus 13 through the bus controller 12.

The bus controller 12 and system bus 13 implement an Extended Industry Standard Architecture (EISA) bus, which is an existing and conventional industry standard. The details of this standard are set forth in a written specification which is publicly available, for example from BCPR Services, Inc. of Washington D.C. and therefore the details of the EISA standard are not described here in detail. The EISA standard is compatible with and includes enhancements to an earlier standard commonly known as the Industry Standard Architecture (ISA). The ISA standard is also, in and of itself, entirely conventional, and is therefore not described in detail here.

FIG. 1 does not show all of the signals of the system bus 13 or all of the signals present within the disk controller circuit 14. Instead, for purposes of convenience and clarity, FIG. 1 shows only those signals which are important for a thorough understanding of the present invention. The names of logical signals which are active low begin with an exclamation point symbol (!).

The system bus 13 includes a 32-bit data bus, eight lines of which are connected to the disk controller circuit 14 as shown at AD0-AD7 in FIG. 1. Other signals of the system bus 13 which are connected to the disk controller circuit 14 include a reset line RESET (which remains deactuated during normal system operation), an input/output read line !IOR, an input/output write line !IOW, a direct memory access (DMA) address enable line AEN, a DMA acknowledge line !DACK, an 8 MHz bus clock signal BCLK, and a DMA request line DRQ. These signals and their relative timing are part of the conventional EISA standard, and they are thus not described in detail here. They are, however, described briefly in order to facilitate an understanding of the present invention.

More specifically, and in accord with the conventional EISA standard, the system bus 13 can carry out various types of cycles which are defined in the EISA standard. One such cycle is a DMA read cycle, in which data is transferred from the memory 29 in CPU 11 across the bus 13 to the disk controller circuit 14 so that it can be stored on one of the drives 21-24, during which cycle the DMA address enable signal AEN and the DMA acknowledge signal !DACK are both actuated, and the signal !IOW is also actuated to indicate to the disk controller circuit 14 the direction in which data is being transferred. A similar cycle is a DMA write, in which the disk controller 14 reads data from one of the drives 21-24, checks the data for errors, and then transfers the data across bus 13 to the memory 29 in CPU 11. Like the DMA read cycle, the signals AEN and !DACK are both actuated, but the signal !IOR is actuated rather than the signal !IOW in order to indicate data is being transferred in the opposite direction. A third type of cycle is a DMA verify, in which the signals AEN and !DACK are both actuated, but the signals !IOR or !IOW both remain deactuated throughout the cycle. The DMA verify cycle is similar to the DMA write cycle, in that the disk controller 14 reads data from one of the disk drives 21-24 and checks the data for errors, but differs in that the disk controller 14 does not attempt to transfer the data to the memory 29 in CPU 11 because the !IOR signal is not actuated. The DMA read, DMA write, and DMA verify cycles are all conventional and were a part of the ISA standard, and have been carried over to the EISA standard.

Under the ISA standard, a device shown diagrammatically at 31 and commonly called a "bus master" can be connected to the system bus and, under certain circumstances, is permitted to take control of the system bus 13 in a manner defined in detail in the ISA standard. When the bus master 31 is controlling the bus 13, it may actuate the DMA request line DRQ, which will cause the bus controller 12 to actuate the DMA acknowledge signal !DACK, even though a true DMA read or write is not in fact taking place, but in this situation the DMA address enable signal AEN is not actuated, whereas the signal AEN is actuated during each of the DMA read, DMA write, and DMA verify cycles carried out by the bus 13 under control of the bus controller circuit 12.

Turning to the disk controller circuit 14, an inverter 34 inverts the bus clock signal BCLK to obtain the commplementary signal !BCLK. The heart of the controller circuit 14 is a controller integrated circuit 36 which is a conventional and commercially available integrated circuit and, in the preferred embodiment, is an Intel 82077 monolithic integrated circuit made by Intel Corporation of Santa Clara, Calif. The controller integrated circuit 36 includes a selectively actuable 16 byte first-in/first-out (FIFO) memory, and is coupled by an eight-bit data bus BD0-BD7 to a bidirectional data buffer 38, the data buffer 38 also being connected to the eight data bus lines AD0-AD7 from the system bus 13. The data buffer 38 is a 74F245 commercially available from National Semiconductor Corporation of Santa Clara, Calif. All devices which can drive the data buses AD0-AD7 and BD0-BD7, including the buffer 38 and the controller 37, do so through selectively actuable three-state outputs. The data buffer 38 has a directional control input DIREC which is driven through an inverter 39 by the bus signal !IOR and which determines whether the data buffer 38 takes data from the bus AD0-AD7 and supplies it to the bus BD0-BD7, or conversely takes data from the bus AD0-AD7 and supplies it to the bus AD0-AD7. In other words, the input DIREC indicates whether the three-state outputs to bus AD0-7 or the three-state outputs to bus BD0-7 should be enabled. Except when !IOR is actuated, for example during a DMA write, the DIREC input is controlled to transfer data from bus AD0-7 to bus BD0-7. The data buffer 38 also has an enable input EN which, in the absence of an enable signal, disables all three-states in the data buffer 38 so that it does not attempt to place data onto either of the buses AD0-AD7 or BD0-BD7.

The controller integrated circuit 36 is capable of operating in a ISA compatible mode, and if the FIFO memory 37 is disabled in this mode the circuit 36 emulates the functions performed by conventional preexisting controller circuits of a type which were used with ISA buses. When the EISA bus 13 carries out a DMA read cycle in ISA compatible mode with the FIFO disabled, data is transferred from the memory 29 in CPU 11 (or some other memory on bus 13) through bus controller 12, bus 13, data buffer 38 and controller integrated circuit 36 to one of the disk drives 21-24. When the bus 13 carries out a DMA write cycle in ISA compatible mode with the FIFO disabled, data is read from one of the disk drives 21-24 and then checked for errors in the controller integrated circuit 36, and then supplied through the buffer 38, bus 13 and bus controller 12 to the CPU 11. During a DMA verify cycle in ISA compatible mode with the FIFO disabled, the controller integrated circuit 36 reads data from one of the drives 21-24 and checks it for errors, but no data is transferred across bus 13 between the controller integrated circuit 36 and CPU 11.

In an EISA system, several of the bus masters 31 may be present and will compete with each other and with the bus controller 12 for control of the bus 13, as a result of which the bus controller 12 and bus 13 may not always be able to accept successive data words from the controller integrated circuit 36 as fast as was possible with an ISA bus operating under the ISA standard. Due to the predetermined rotational speed of the disk, successive bytes of data are read from the disk at fixed time intervals, and thus the disk controller must be able to handle each byte before the next one is read. In a typical ISA machine, each byte was placed in a single register, and the ISA bus was such that the byte was typically picked up from the register for transfer across the bus within a time period of 14.5 μsec. Under EISA, it may be 30.9 μsec before the byte is picked up from the register, and in some circumstances even longer, which means the disk controller can find itself receiving a byte from the disk before the previous byte was picked up from the register. An ISA disk controller typically forces each byte into the register with the assumption that the previous byte was already picked up, but due to the longer bus latency under EISA this approach results in the destruction of the previous byte before it can be picked up and transferred, and this loss of the data presents a serious problem.

Therefore, to facilitate data throughput with the EISA bus 13 despite the longer latency, and to avoid data loss, the controller integrated circuit 36 has, in addition to the ISA compatible operational mode mentioned above, additional operational modes which are intended specifically for use when the bus 13 is carrying out extended operations allowed under the EISA standard but not under the ISA standard, these additional modes being commonly referred to as Type A, Type B and Type C. The FIFO memory 37 can be enabled in any of the A, B, C and ISA compatible modes of the integrated circuit 36, and thus up to 16 bytes may be transferred in rapid succession between the memory 29 of CPU 11 and the FIFO memory 37. At the time the conventional 82077 controller integrated circuit 36 was designed, it was assumed that it would be sufficient to customize the ROM-based BIOS program in the ROM 30 of CPU 11 in a manner which would ensure that the controller integrated circuit was in a mode compatible with current system operation. Software programs which were written for computers using the ISA standard and which used the BIOS routines in those computers to carry out all communication with the hardware could thus be run successfully on the EISA system 10 shown in FIG. 1, because the BIOS routines in ROM 30 would know that the enhanced controller integrated circuit 36 is present in the system and thus control it in the proper manner so as to avoid errors.

Since all software packages are supposed to communicate with the hardware only through the BIOS routines, this was expected to be a satisfactory solution. Unfortunately, in order to enhance the operational speed of their programs, some software publishers distributed programs for ISA computers which did not communicate with the hardware only through the BIOS routines, but instead occasionally ignored certain BIOS routines and communicated directly with the hardware. When an attempt is made to run a program of this type in a machine using the enhanced controller integrated circuit 36, problems can develop. One specific problem of interest here is a situation where, due to the fact that the program is attempting to interface directly with hardware which is different from the hardware it was written to interface with, the program may inadvertently enable the FIFO memory 37 in the controller integrated circuit 36 and then attempt to carry out a DMA read, write or verify cycle. In the case of a DMA read or write cycle, the controller integrated circuit 36 will operate properly regardless of whether or not the FIFO is enabled. On the other hand, if the bus controller 12 causes the bus 13 to carry out a DMA verify cycle when the FIFO of the controller integrated circuit 36 is enabled, a problem will result. In particular, and as mentioned above, during a DMA verify cycle, neither of the signals !IOR and !IOW is actuated. When the FIFO in the controller integrated circuit 36 is disabled, this causes the circuit 36 to do the usual verify function, but when the FIFO in the controller integrated circuit 36 is enabled, the controller integrated circuit 36 will automatically and forcibly record an indication of an error if neither of the signals !IOR or !IOW is actuated during the cycle. In order to avoid this situation, in which an error indication is forcibly produced despite the fact that no real error has occurred, a special verify error suppression circuit 41 is provided to monitor selected signals from the system bus 13 and, in response to detection of a DMA verify cycle, supply a special input/output read signal !IOR077 to a read input RD of the controller integrated circuit 36 despite the fact that neither of the signals !IOR or !IOW is in fact actuated at any time during the cycle. The read input was designed to be connected directly to the bus signal !IOR, but instead receives the special signal !IOR077.

The concept of the verify error suppression circuit 41 is not itself new. The focus of the present invention is the provision of an improved verify error suppression circuit. In the preferred embodiment, the error suppression circuit 41 is implemented in a generic array logic (GAL) device which is a 16V8 part manufactured by National Semiconductor Corporation of Santa Clara, Calif.

Turning in more detail to the specific verify error suppression circuit 41 according to the invention, three inverters 46, 47 and 48 respectively invert the signals !DACK, !IOW and !IOR from the system bus 13. A three-input OR gate 51 has two of its inputs connected to the outputs of the inverters 47 and 48, and has an output connected to one of three inputs of an AND gate 52, the other two inputs of the AND gate 52 being connected to the output of the inverter 46 and to the signal AEN from the bus 13. The output of the AND gate 52 is a signal FLAG, which is connected to a state circuit 54 and to the remaining input of the OR gate 51. The signal FLAG is initially low, and thus the AND gate 52 will be actuated only when the bus signals AEN and !DACK are both actuated while simultaneously either !IOR or !IOW is actuated. When either of these conditions enables the AND gate 52, the signal FLAG changes to a logic high level, which causes the OR gate 51 to supply a logic high level to the AND gate 52, and thus the AND gate 52 will remain enabled so long as the signals AEN and !DACK both remain actuated, even if the signal !IOR or !IOW which was actuated becomes deactuated. In other words, the signal FLAG latches itself in an actuated state so long as the signals AEN and !DACK both remain actuated. Subsequently, when either of the signals AEN or !DACK becomes deactuated, the AND gate 52 becomes disabled and its output FLAG returns to a logic low level and disables the latching effect.

The state circuit or state machine 54 receives the signals RESET, AEN, DACK, !BCLK, and FLAG, and produces two output signals IOR077 and DISABLE. The state circuit 54 is described in more detail below. The verify error suppression circuit 41 also includes an AND gate 56 having two active-low inputs respectively connected to the signals RESET and !IOR from the system bus 13, and having an output which is connected to one input of a two-input NOR gate 57, the other input of the NOR gate 57 being connected to the output IOR077 of the state circuit 54, and the output of the NOR gate 57 providing the special output signal !IOR077 of the verify error suppression circuit 41 which is connected to the RD input of the controller integrated circuit 36. The gates 56 and 57 basically pass the normal bus signal !IOR through the suppression circuit 41 to the controller integrated circuit 36. In a manner described in more detail below, the state circuit 54 looks for a situation in which the bus 13 is carrying out a DMA verify cycle, during which the signals !IOR and !IOW both remain deactuated throughout the cycle, and produces the output IOR077 which is supplied through the NOR gate 57 to the controller integrated circuit 36 so that, regardless of the mode in which the controller integrated circuit 36 is operating and regardless of whether or not the FIFO memory 37 is enabled, the controller integrated circuit 36 will always receive an input/output read signal during a DMA verify cycle. Thus, each time the bus 13 carries out a DMA verify cycle, the controller integrated circuit 36 will receive the special input/output read signal !IOR077 and will be deceived into treating the cycle as a DMA write cycle. Consequently, the controller integrated circuit 36 never really does a verify function in any mode when the bus 13 carries out a DMA verify cycle, but instead always believes that a DMA write cycle is in progress and acts accordingly.

The controller integrated circuit 36 is designed so that, whenever its RD input is actuated, it enables the three-state buffers through which it supplies data to the data bus BD0-BD7. Consequently, when the state circuit 54 is generating the signal IOR077 which through gate 57 actuates the RD input of the controller integrated circuit 36, the controller integrated circuit 36 will actuate its three-state buffers to try to put data onto the bus BD0-BD7. However, since the signal !IOR from the bus 13 is not actuated, the data buffer 38 would also be attempting to enable its three-state buffers in an attempt to supply data to the bus BD0-BD7. Simultaneously enabling both sets of three-state buffers for a single bus would create a conflict between the three-state buffers of the two devices and, over time, could damage one or both devices. In order to avoid such damage, the state circuit 54 actuates its output DISABLE from a point in time prior to actuation of the signal IOR077 to a point in time after deactuation of the signal IOR077. The actuation of the signal DISABLE has the effect of disabling all the three-state buffers in the data buffer 38, so that only the three-state buffers in the controller integrated circuit 36 are driving the data bus BD0-BD7 when the system bus 13 is carrying out a DMA verify cycle.

Figure 2A:
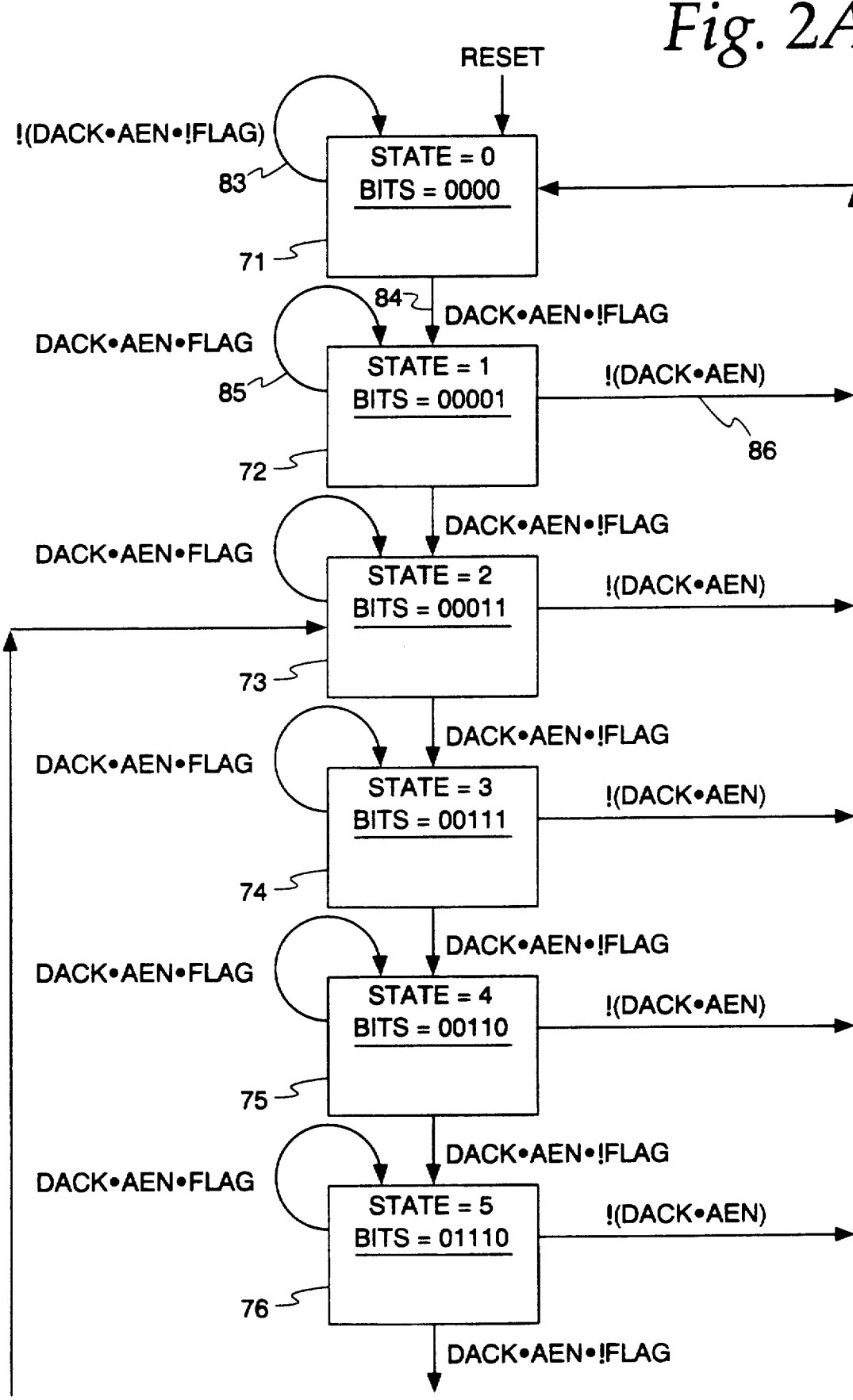
FIG. 2, comprised of FIGS. 2A, 2B and 2C, is a state diagram for a state circuit which is a component of the system of FIG. 1.
Figures 2B, 2C:
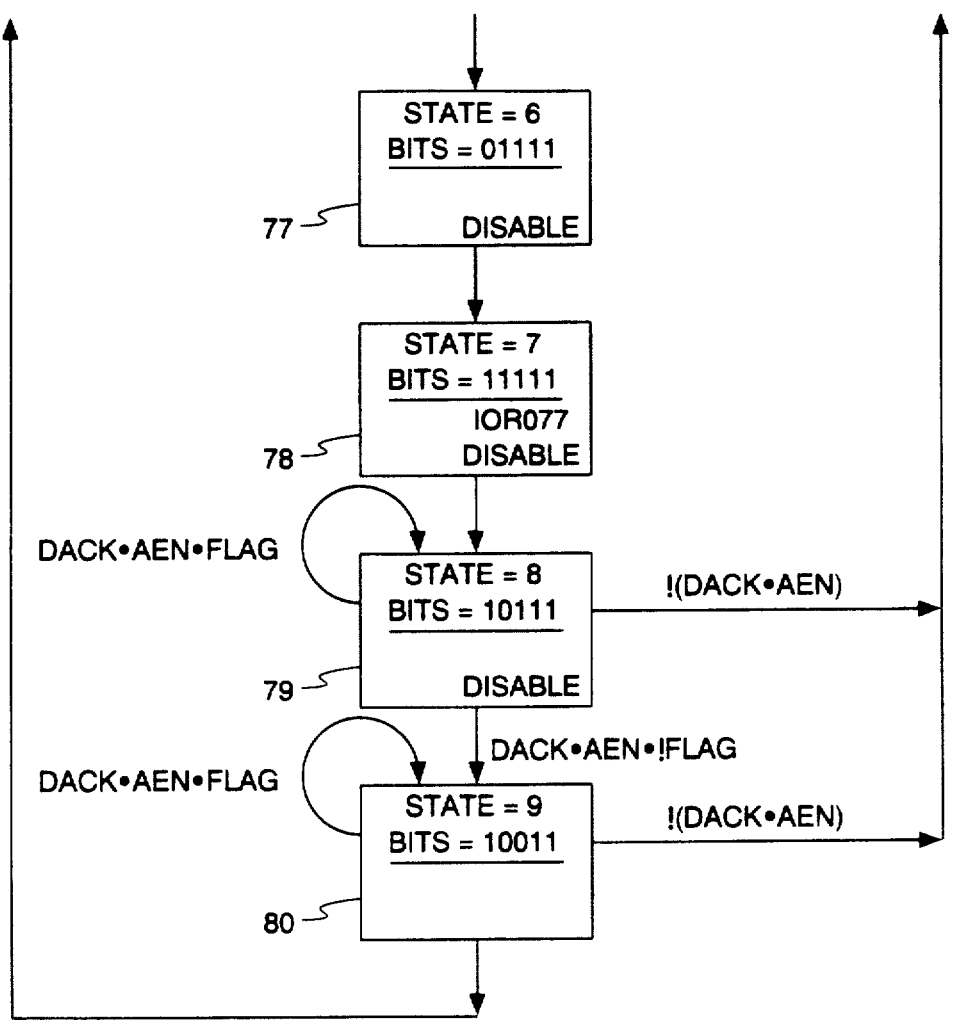

FIG. 2 is a state diagram for the state circuit 54 of FIG. 1. The state diagram of FIG. 2 shows 10 states 71-80 which are each represented, by a respective rectangular block. Each time the bus clock signal BCLK has a falling edge, and thus when the complementary signal !BCLK from the inverter 34 has a rising edge, a transition is made in the state diagram of FIG. 2 from the current controller state to the next controller state, the next controller state being in some cases the same as the current state. The upper portion of each rectangular block shows a unique state number for each state, and a unique binary state bit combination for each block. It should be noted that this state machine has five state bits. The lower portion of each block indicates whether one of the two output signals of the state circuit is generated during the state corresponding to that block. For example, it will be noted that the lower half of block 78 indicates that the signals IOR077 and DISABLE are both generated during the state corresponding to block 78, whereas the lower half of block 76 is blank to indicate that neither of these output signals is generated during the state corresponding to block 76.

A system reset forces the state circuit of FIG. 2 into state 71, where no output signals are generated. So long as there is a system reset signal on line RESET, the state circuit will stay in state 71. The signal FLAG will be initially deactuated. After the system reset, each falling edge of the signal BCLK will cause the state circuit to stay in state 71 so long as the signals DACK and AEN are not both simultaneously actuated, as indicated diagrammatically at 83. When the signals DACK and AEN are both actuated simultaneously, on the next state transition the circuit will move to state 72, and will continue to progress in successive state transitions to states 73, 74, 75, 76 and 77 so long as the signals DACK and AEN both remain actuated and the signal FLAG remains deactuated. In each of the six states 71-76, the circuit in FIG. 1 which includes gates 51 and 52 is monitoring for the actuation of either !IOR or !IOW and, if either of these signals is actuated, the gate 52 will actuate the signal FLAG to indicate that the cycle in progress is a DMA read or a DMA write, rather than a DMA verify.

In the event the signal FLAG becomes actuated during any one of the states 72-76, the state circuit will remain in that state throughout the rest of the bus cycle, for example as shown diagrammatically at 85 in FIG. 2 for state 72. When either signal AEN or DACK is deactuated at the end of the bus cycle in which FLAG was actuated, the state circuit will transition directly back to state 71, for example as shown diagrammatically at 86 for the transition from state 72 to state 71, and gates 51 and 52 (FIG. 1) will deactuate FLAG.

If neither of the signals !IOR or !IOW has been enabled by the time the state machine transitions to state 77, then the state circuit knows that the bus cycle in progress is a DMA verify, and so in state 77 it actuates the output signal DISABLE in order to disable the three-state buffers of the data buffer circuit 38 of FIG. 1. This signal remains continuously actuated through the next two states, namely states 78 and 79. During state 78 only, the state circuit actuates the output signal IOR077, which through the gate 57 in FIG. 1 generates the signal !IOR077 to the controller integrated circuit 36.

Thereafter, so long as the signal DACK and AEN remain actuated and the signal FLAG remains deactuated, the state circuit will transition to states 79 and 80 and then back to state 73, and will then continue cycling through states 73-80 so that it can handle a series of successive DMA verify cycles. If the state circuit determines in any of the states 73-76, 79 or 80 that the signal FLAG has become actuated, it will remain in that state so long as the signals DACK and AEN remain actuated, and then transition directly back to state 71 as soon as either one of the signals DACK and AEN becomes deactuated. Similarly, if the state circuit determines in any one of the states 73-76, 79 or 80 that either of the signals DACK or AEN has become deactuated, the state circuit will transition directly back to state 71 regardless of the state of the signal FLAG. It will be noted that the first DMA verify cycle uses nine BCLK clock periods (states 72 to 80), and that any additional verify cycles immediately following it will use eight BCLK clock periods (states 73 to 80), which is in accord with the ISA specification and the EISA specification.

Referring to the state bits set forth in the upper half of each state block in FIG. 2, it will be noted that, except for the transition from any state back to original state 71, every state transition involves a change in only one of the five state bits. When only one state bit changes, it is not possible for the state machine to inadvertently and momentarily pass through a third state and produce an output signal associated with that third state when it is supposed to be transitioning directly from a first state to a second state. Thus, the state machine of FIG. 2 is highly reliable.

Figure 3:
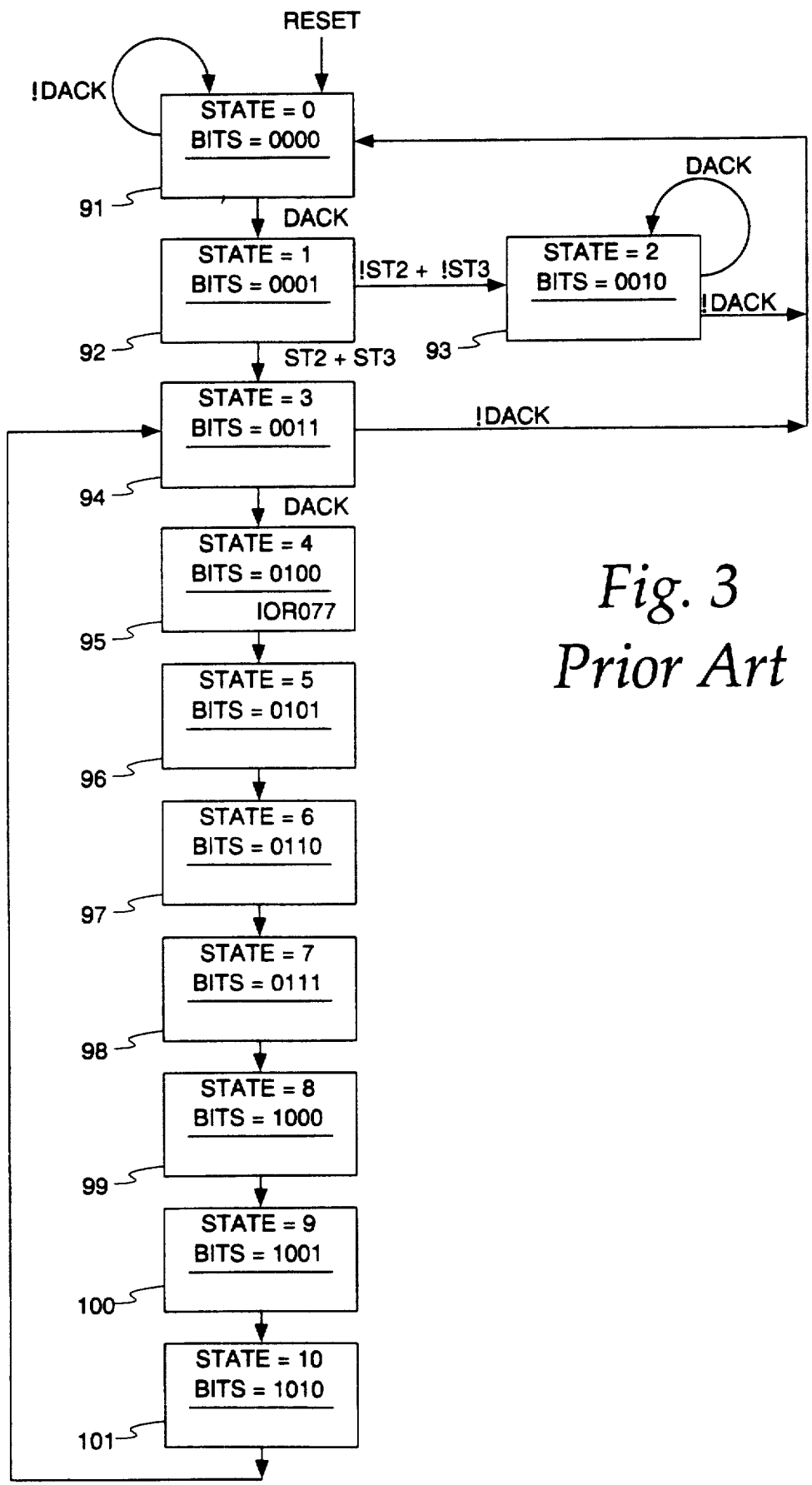
FIG. 3 is a state diagram for a conventional state circuit.

FIG. 3 is a state diagram for a conventional verify error suppression circuit. It has eleven states 91-101. While this state circuit has been adequate for its intended purposes, it has not been satisfactory in all respects. In particular, it will be noted from state 92 that this state diagram monitors the signals ST2 and ST3 which are generated by circuitry associated with microprocessor 26 in the CPU 11 of FIG. 1. As explained above, these two signals are local to the CPU 11, or in other words are not part of the standard EISA bus according to the EISA standard. Consequently, the state diagram of FIG. 3 is suitable only for use in a situation where the controller integrated circuit 36 happens to be mounted on the same circuit board as the CPU 11 and thus has access to the signals ST2 and ST3 which are local to the CPU 11. Frequently, however, a disk controller such as that shown at 14 in FIG. 1 is added to a computer system subsequent to the manufacture of the system, in particular by plugging a circuit card containing the controller into a connector slot which is part of the EISA system bus, so that the disk controller has access only to the signals which are part of the system bus and has no access to signals such as ST2 and ST3 which are local to the circuit board containing the CPU. Obviously, the state diagram of FIG. 3 is entirely useless in such a situation.

In addition, it will be noted that only a single output signal IOR077 is generated by the state diagram of FIG. 3. In other words, the state diagram of FIG. 3 does not produce a signal analogous to the DISABLE signal produced by the inventive state diagram of FIG. 2. As a result, if an attempt was made to use the state diagram of FIG. 3 in association with a data buffer and controller chip such as those shown at 38 and 36 in FIG. 1, the three-state buffers of the data buffer 38 and chip 36 would both be simultaneously enabled during DMA verify cycles, with the ultimate possibility of actual damage to one or both of the parts 36 and 38.

Moreover, it will be noted that there are a number of state transitions in the state diagram of FIG. 3 in which two or more of the state bits change at once. Thus, for example, when a transition is occurring from state 96 to state 97, if the least significant state bit changes more quickly than the adjacent state bit, the state bits could momentarily have the value "0100" which is associated with state 95, which might cause the state machine to briefly produce the signal IOR077 for state 95 as it transitioned from 96 to state 97, whereas in fact this signal is not supposed to be produced at all during the transition from state 96 to state 97.

Figure 4:
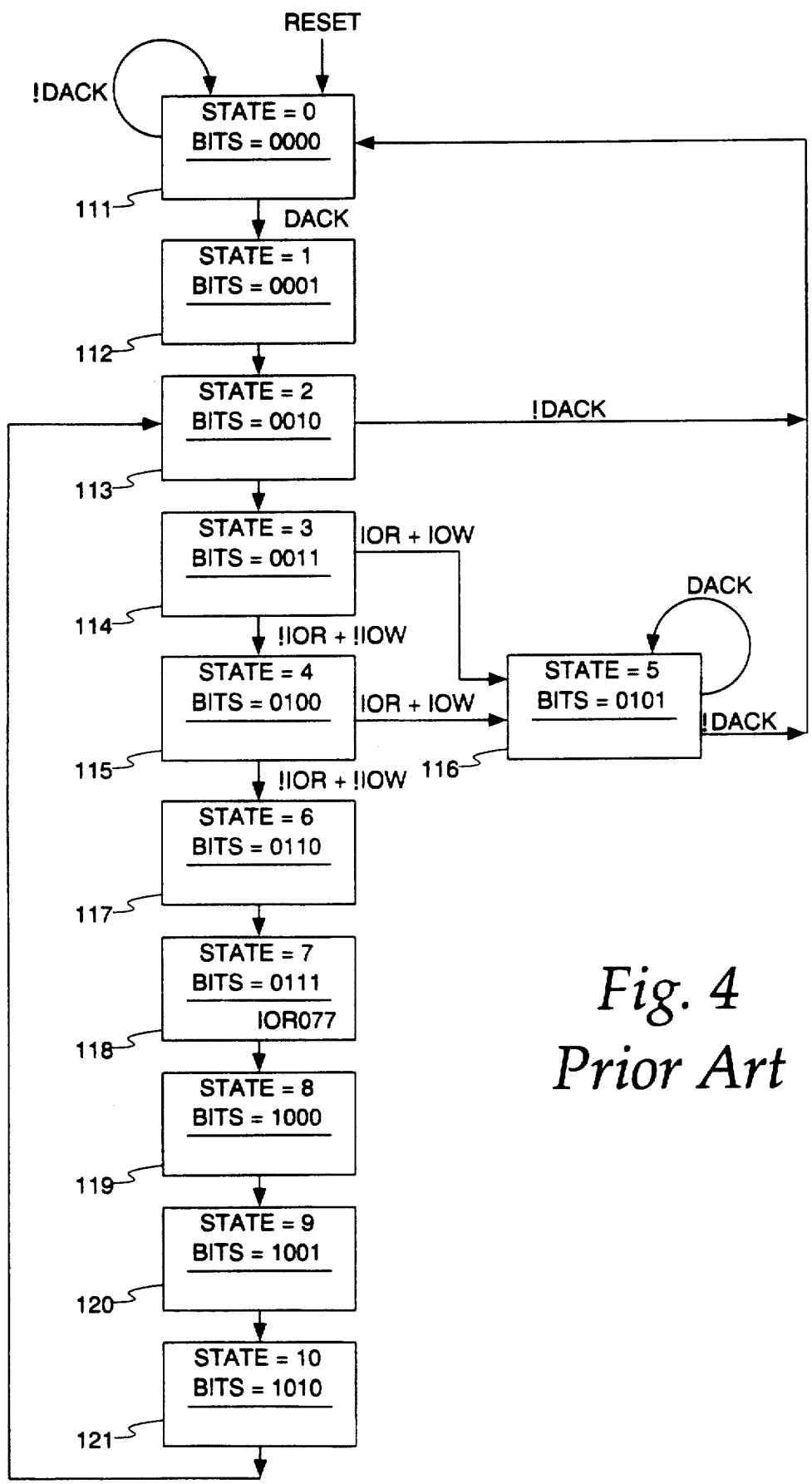
FIG. 4 is a state diagram for a different conventional state circuit.

FIG. 4 shows a different conventional state diagram, which has eleven states 111-121. The state diagram of FIG. 4 monitors only signals which are present on the EISA bus 13. Thus, like the inventive state diagram of FIG. 2, it is suitable for use not only on a circuit board which also contains the CPU, but also on a circuit board which is plugged into a bus connector slot and thus has access only to the signals of the bus 13. This approach has also been adequate for its intended purposes, but has not been satisfactory in all respects. In particular, like the state diagram of FIG. 3, the state diagram of FIG. 4 produces only a single output signal IOR077 (state 118), and thus would produce three-state contention problems if used to control the buffer 38 and chip 36 of FIG. 1.

In addition, like the state diagram of FIG. 3, there are several state transitions in which at least two of the state bits change. Thus, if the two least significant state bits changed more slowly than the adjacent state bit during a transition from state 114 to state 115, the state bits would briefly assume the value "0111" which corresponds to state 118, and thus the state machine would briefly produce the output signal IOR077 corresponding to state 118 during the transition from state 114 to state 115 despite the fact that this output signal is not supposed to be produced during this particular transition.

Moreover, the signals !IOR and !IOW are monitored only during two of the states, namely states 114 and 115. This is suitable for the specific timing associated with ISA-standard DMA read, DMA write and DMA verify cycles, but the EISA standard permits other bus cycles in which !IOR and !IOW are actuated at different times during the cycle, which would not be detected by the state diagram of FIG. 4. The state diagram of FIG. 4 would thus produce the signal IOR077 for the controller integrated circuit during a cycle when in fact this signal should be inhibited. In contrast, it will be noted that the state diagram of FIG. 2 checks for the presence of !IOR or !IOW in eight of its ten states, namely states 71-76, 79 and 80. Thus, the inventive state diagram of FIG. 2 will correctly control the controller integrated circuit 36 in response to all types of EISA bus cycles.

Yet another important difference is that the conventional state diagram of FIG. 4 monitors the signal DACK, but not the signal AEN. As mentioned above, the signal DACK is actuated not only during DMA cycles, but may also be actuated by a bus master such as that shown in FIG. 1 during a bus cycle which is not a DMA cycle. Consequently, actuation of the signal DACK by a bus master can cause the state diagram of FIG. 4 to proceed to state 118 and produce the output signal IOR077 to the controller integrated circuit 36 during a bus cycle when the signal IOR077 should not be produced because the bus master 31 is controlling the bus. In contrast, the inventive state diagram shown in FIG. 2 monitors not only the signal DACK, but also the signal AEN. The only time the signals DACK and AEN are actuated simultaneously is during a DMA cycle, and thus the state diagram of FIG. 2 will not produce erroneous signals to the controller integrated circuit during non-DMA cycles executed under control of the bus master 31.

Those of ordinary skill in the art are thoroughly familiar with state diagrams and how to generate a logic circuit to implement a state diagram. As an example, the book "Switching and Finite Automata Theory" by Svi Kohavi of the Massachusetts Institute of Technology, published in 1970 by McGraw-Hill, Inc. of New York, includes a clear explanation of how to generate a logic circuit to implement a state diagram of the type shown in FIG. 2. Accordingly, it is believed unnecessary to disclose a specific circuit here to implement the state diagram of FIG. 2.

Although a preferred embodiment of the present invention has been described in detail for illustrative purposes, it will be recognized that variations or modifications may be made to the preferred embodiment without departing from the scope of the present invention.

The embodiments of the invention in which an exclusive property or privilege is claimed are defined as follows:

1. An apparatus comprising: a system bus having data lines and control lines, said control lines including a direct memory access acknowledge line, a direct memory access address enable line, and an input/output control line, said system bus including first means for causing said system bus to carry out a plurality of predetermined cycles which include a first cycle during which said acknowledge line, enable line and input/output control line are each actuated and a second cycle during which said acknowledge line and enable line are actuated and said input/output control line remains deactuated; a data storage device; a controller circuit; and second means for operatively coupling said controller circuit to said data storage device and to said system bus, including means for actuating a control input of said controller circuit in response to actuation of said input/output control line, said controller circuit being operable in first and second modes, wherein in each of said first and second modes said controller circuit is responsive to execution by said system bus of said first cycle for obtaining and error-checking data from said storage device and for supplying the data to said data lines of said system bus, wherein in said first mode said controller circuit is responsive to execution by said system bus of said second cycle for obtaining and error-checking data from said storage device, and wherein in said second mode said controller circuit is responsive to an absence of actuation of said control input thereof during one of said first and second cycles for generating an error indication, said second means including third means for preventing said controller circuit from producing said indication of said error condition in said second mode, said third means being responsive to said acknowledge line and enable line being simultaneously actuated while said input/output control line remains deactuated through one of said bus cycles for actuating said control input of said controller circuit.

2. An apparatus as recited in claim 1, wherein said second means includes a bidirectional data buffer coupling said data lines of said system bus to said controller circuit, said data buffer having three-state data outputs which are coupled to three-state data outputs of said controller circuit and having an enable control input facilitating selective enabling and disabling of said three-state data outputs of said data buffer, and wherein said third means is responsive to said acknowledge line and said enable line being simultaneously actuated while said input/output control line remains deactuated through one of said bus cycles for applying to said enable input of said data buffer a signal which disables said three-state data outputs thereof.

3. An apparatus of claim 2, wherein said third means continuously applies said signal to said enable input of said data buffer from a point in time prior to actuation of said control input of said controller circuit by said third means to a point in time subsequent to deactuation of said control input of said controller circuit.

4. An apparatus of claim 1, wherein said control lines of said system bus include a bus clock signal, wherein said third means includes a state circuit having a plurality of respective states, said state circuit transitioning from a current one of said states to a next one of said states at an end of each period of said bus clock signal, wherein in response to simultaneous actuation of said acknowledge line and enable line while said input/output line remains deactuated said state circuit successively transitions from a first state through second, third, fourth, fifth and sixth states to a seventh state, and then to an eighth state during which said control input of said controller circuit is actuated, said controller input of said controller circuit being deactuated at an end of said eighth state.

5. An apparatus comprising: a system bus having data lines and control lines, said control lines including a direct memory access acknowledge line, a direct memory access address enable line, and an input/output control line, said system bus including first means for causing said system bus to carry out a plurality of predetermined cycles which include a first cycle during which said acknowledge line, enable line and input/output control line are each actuated and a second cycle during which said acknowledge line and enable line are actuated and said input/output control line remains deactuated; a data storage device; a controller circuit; and second means for operatively coupling said controller circuit to said data storage device and to said system bus, including means for actuating a control input of said controller circuit in response to actuation of said input/output control line, said controller circuit being operable in first and second modes, wherein in each of said first and second modes said controller circuit is responsive to execution by said system bus of said first cycle for obtaining and error-checking data from said storage device and for supplying the data to said data lines of said system bus, wherein in said first mode said controller circuit is responsive to execution by said system bus of said second cycle for obtaining and error-checking data from said storage device, and wherein in said second mode said controller circuit is responsive to an absence of actuation of said control input thereof during one of said first and second cycles for generating an error indication, said second means including third means for preventing said controller circuit from producing said indication of said error condition in said second mode, said third means being responsive to said acknowledge line and enable line being simultaneously actuated while said input/output control line remains deactuated through one of said bus cycles for actuating said control input of said controller circuit; wherein said control lines of said system bus include a bus clock signal, wherein said third means includes a state circuit having a plurality of respective states, said state circuit transitioning from a current one of said states to a next one of said states at an end of each period of said bus clock signal, wherein in response to simultaneous actuation of said acknowledge line and enable line while said input/output line remains deactuated said state circuit successively transitions from a first state through second, third, fourth, fifth and sixth states to a seventh state, and then to an eighth state during which said control input of said controller circuit is actuated, said controller input of said controller circuit being deactuated at an end of said eighth state; and wherein said state circuit transitions from said eighth state to a ninth state and, if said acknowledge line and said enable line remain simultaneously actuated while said input/output control line remains deactuated, to a tenth state and then to said third state.

6. An apparatus of claim 5, wherein said second means includes a data buffer which couples said data lines of said system bus to said controller circuit, said data buffer having three-state data outputs which are connected to three-state data outputs of said controller circuit and having an enable input which facilitates selective actuation and deactuation of said three-state data outputs of said data buffer, and wherein during said seventh, eighth and ninth states said state circuit produces a signal which is applied to said enable input of said data buffer and disables said three-state outputs thereof.

7. An apparatus of claim 5, wherein when one of said acknowledge line and enable line is disabled during one of said second, third, fourth, fifth, sixth, ninth or tenth states, a transition is made at the end of such state directly to said first state.

8. An apparatus of claim 5, wherein when said input/output control line is actuated during one of said first, second, third, fourth, fifth, sixth, ninth or tenth states, said state circuit remains continuously in that particular state through successive bus clock periods until one of said enable line and said acknowledge line is disabled, and then transitions directly to said first state.

9. An apparatus of claim 5, including an OR gate having a first input coupled to said input/output control line of said system bus and having an output, an AND gate having first and second inputs respectively coupled to said enable line and said acknowledge line of said system bus, having a third input coupled to said output of said OR gate and having an output coupled to a second input of said OR gate, wherein if said output of said AND gate becomes actuated during one of said first, second, third, fourth, fifth, sixth, ninth or tenth states, said state circuit remains in that state through successive bus clock periods until one of said enable line and said acknowledge line becomes deactuated, and then transitions directly to said first state.

10. An apparatus of claim 5, wherein said state circuit has a plurality of state elements which can each be switched between first and second logical conditions, wherein each said state is associated with a unique combination of logical conditions of said state elements, and wherein only one of said state elements changes from one of said logical conditions to the other thereof during a transition from each said state to a successive said state other than said first state.

11. An apparatus of claim 10, wherein said state circuit includes five of said state elements, and wherein said unique combinations of logical conditions of said state elements respectively associated with said first through said tenth states are respectively 00000, 00001, 00011, 00111, 00110, 01110, 01111, 11111, 10111 and 10011.

12. An apparatus of claim 1, wherein said system bus is an Extended Industry Standard Architecture bus.

13. An apparatus of claim 12, wherein said controller circuit is an Intel 82077 series monolithic integrated circuit.

14. A method for controlling a system which includes a system bus having data lines, having a direct memory access acknowledge line, having a direct memory access address enable line, and having an input/output control line, a data storage device, a controller circuit having a control input, and means for operatively coupling said controller circuit to said data storage device and to said system bus, the controller circuit being operable in first and second modes and producing an indication of an error condition in said second mode in response to an absence of actuation of said control input during a bus cycle, said method comprising the steps of: causing said system bus to carry out a plurality of predetermined cycles which include a first cycle during which said acknowledge line, enable line and input/output control line are each actuated and a second cycle during which said acknowledge line and enable line are actuated and said input/output control line remains deactuated; actuating said control input of said controller circuit in response to actuation of said input/output control line; causing said controller circuit in each of said first and second modes thereof to obtain and error-check data from said storage device and to supply the data to said data lines of said system bus in response to execution by said system bus of said first cycle; causing said controller circuit in said second mode thereof to obtain and error check data from said storage device in response to execution by said system bus of said second cycle; and actuating said control input of said controller circuit in response to said acknowledge line and said enable line being simultaneously actuated while said input/output control line remains deactuated during one of said bus cycles.

* * * * *